(12) United States Patent
Edwards et al.

(10) Patent No.: US 9,306,417 B2
(45) Date of Patent: Apr. 5, 2016

(54) LOAD-SHARING AND BOOST VOLTAGE FOR NOTIFICATION APPLIANCE CIRCUITS

(75) Inventors: William Edwards, Bradenton, FL (US); Richard P. Tucker, Bradenton, FL (US); Donald Becker, Bradenton, FL (US)

(73) Assignee: UTC FIRE & SECURITY AMERICAS CORPORATION, INC., Farmington, CT (US)

( * ) Notice: Subject to any disclaimer, the term of this patent is extended or adjusted under 35 U.S.C. 154(b) by 830 days.

(21) Appl. No.: 13/311,116

(22) Filed: Dec. 5, 2011

(65) Prior Publication Data

US 2013/0140888 A1 Jun. 6, 2013

(51) Int. Cl.
  *H02J 1/10* (2006.01)
  *H02J 9/02* (2006.01)

(52) U.S. Cl.
  CPC ... *H02J 9/02* (2013.01); *H02J 1/10* (2013.01); *Y10T 307/32* (2015.04)

(58) Field of Classification Search
  USPC .............. 307/20, 43, 81; 315/86, 88, 90, 161
  See application file for complete search history.

(56) References Cited

U.S. PATENT DOCUMENTS

| | | | |
|---|---|---|---|
| 4,468,722 A | | 8/1984 | Kammiller |
| 4,751,398 A | | 6/1988 | Ertz, III |
| 5,834,925 A | * | 11/1998 | Chesavage .............. H02J 1/108 307/58 |
| 6,278,624 B1 | | 8/2001 | Nelson |
| 6,876,159 B1 | | 4/2005 | Wu et al. |
| 7,459,881 B2 | | 12/2008 | Barrieau |
| 7,746,242 B2 | | 6/2010 | Schwendinger et al. |
| 2003/0132669 A1 | | 7/2003 | Bahl et al. |
| 2008/0272654 A1 | | 11/2008 | Lontka |
| 2009/0167544 A1 | * | 7/2009 | Becker ..................... G08B 3/10 340/636.12 |
| 2010/0046940 A1 | | 2/2010 | Cotton et al. |
| 2010/0277140 A1 | | 11/2010 | Liu |
| 2012/0112641 A1 | * | 5/2012 | Leshniak ................ H02J 9/065 315/161 |

OTHER PUBLICATIONS

European Patent Office Communication, Notification of Transmittal of The International Search Report and the Written Opinion of the International Searching Authority, or the Declaration from International Application No. PCT/US2012/063450 dated Mar. 26, 2013, 12 Pages.
"Low-Power Battery Backup IC With Integrated Boost Converter," Texas Instruments TPS655510, Sep. 2008.

* cited by examiner

*Primary Examiner* — Rexford Barnie
*Assistant Examiner* — Xuan Ly
(74) *Attorney, Agent, or Firm* — Cantor Colburn LLP

(57) ABSTRACT

A power system includes one or more notification circuits for powering notification devices, a backup power source, and a plurality of primary power supplies. The primary power supplies are configured to provide a combined current to the notification circuits. Each primary power supply regulates its output current to equal a highest output current provided by one of the primary power supplies so that each contributes approximately the same current to the load. The primary power supplies also include boost regulator circuits for boosting the voltage of the backup power supply.

16 Claims, 3 Drawing Sheets

LOAD-SHARING AND BOOST VOLTAGE FOR NOTIFICATION APPLIANCE CIRCUITS

BACKGROUND

The current invention is related to powering notification appliance circuits (NACs), and in particular to a system and method for providing boost voltage and load-sharing for a plurality of NACs.

Emergency systems, such as fire systems, often contain one or more NACs. These NACs provide power to several emergency notification devices such as, but not limited to, strobe lights and sirens. Each notification device has a specified working voltage and current. Regulations require these NACs to continuously provide a proper working voltage and current in order to ensure continuous, uninterrupted operation of the emergency notification devices. Therefore, a power source must supply enough power to the one or more NACs to provide a working voltage and current to each notification device, taking into account any voltage drops such as those caused by wiring impedances and power switches.

Traditionally, NACs have been powered through the use of a single power supply. The power supply often contains an AC power source that is converted from AC to DC power. If this power supply malfunctions, the NACs are powered entirely by a backup power source. The backup power source usually consists of a backup battery. Batteries can only operate at a given voltage for a limited amount of time before the voltage of the battery drops. Once the voltage of the battery falls below the required working voltage of the NAC, the notification devices will fail to function as specified.

SUMMARY

A system and method that provides a working voltage and current to one or more notification appliance circuits (NACs) includes a plurality of primary power supplies, and a backup power source, which provide power to the one or more NACs. Each primary power supply regulates its output voltage so that each supply sources an approximately equal current to the one or more NACs. Each primary power supply consists of an AC source, an AC-DC converter, a switching network, a load-sharing controller, and a boost regulator circuit.

DETAILED DESCRIPTION

The present invention describes an electrical power system that provides a working voltage and current to one or more notification appliance circuits (NACs). In particular, the system contains a plurality of primary power supplies, and one or more backup power sources. Each primary power supply contains an AC power source, an AC-DC converter, a boost regulator circuit, a load-sharing controller, and a switching network. The backup power source provides power to each of the primary power supplies in the event that a primary power supply's AC power source is unavailable or malfunctioning. The boost regulator circuit of each primary power supply boosts the voltage supplied to the respective primary power supply from the backup power source when the backup power source's voltage is no longer sufficient for the power system to supply a working voltage and current to the one or more NACs.

Figure 1:
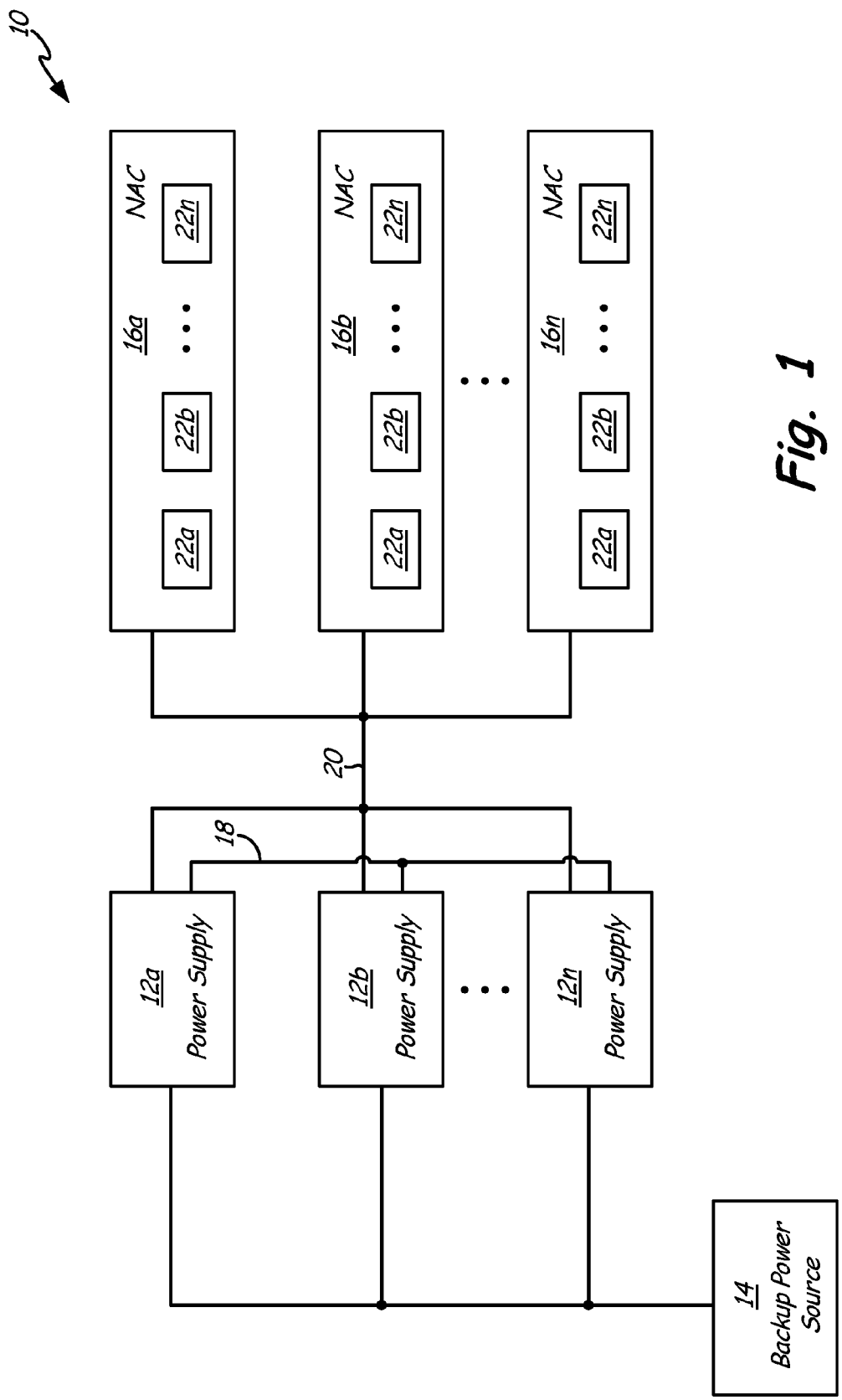
FIG. 1 is a block diagram of an embodiment of the present invention.

FIG. 1 is a block diagram illustrating an embodiment of electrical power system 10 for providing power to one or more NACs 16a-16n. System 10 includes primary power supplies 12a-12n, backup power source 14, load-sharing bus 18, and power supply path 20. Each of the NACs 16a-16n contain notification devices 22a-22n. Notification devices 22a-22n may be any notification device such as a siren or a strobe light. While illustrated schematically as a single backup power source, a plurality of backup sources may be used, such that each primary power supply 12a-12n has its own dedicated backup power source 14. Backup power source 14 may comprise one or more batteries.

The combination of primary power supplies 12a-12n provide load-sharing for NACs 16a-16n. Load-sharing is used in electrical power systems to provide a current to a load using multiple power sources in parallel. The circuit is designed such that each power source provides an approximately equal fraction of the total current of the system. This configuration provides redundancy and reliability, and eliminates the need for a single power source to provide large output currents to one or more loads.

Load-sharing in system 10 consists of providing a combined current from primary power supplies 12a-12n to NACs 16a-16n such that each primary power supply 12a-12n provides an approximately equal current, and the combined current is greater than the current provided by any single primary power supply. For example, if NACs 16a-16n require 30 amperes, each primary power supply 12a-12n will regulate its output such that the current is approximately equal to 30/n amperes. If there are three primary power supplies, each source will provide a current that is approximately 10 amperes.

Load-sharing bus 18 is used to provide each primary power supply 12a-12n with a voltage proportional to the highest current provided by any of primary power supplies 12a-12n. Each primary power supply 12a-12n may then compare the voltage on load-sharing bus 18 with a voltage representative of its own output current. If the voltage on load-sharing bus 18 is greater than the voltage representative of its own output current, the respective primary power supply will adjust its output voltage such that it outputs an approximately equal current to that communicated on load-sharing bus 18. If the voltage on load-sharing bus 18 is not greater than the voltage of the respective primary power supply, the respective primary power supply will not adjust its output current.

If one of primary power supplies 12a-12n fails to operate correctly, backup power source 14 will provide power in place of the unavailable primary power supply. For example, if there are three primary power supplies, all supplying 10 amperes of current, and one of the power supplies becomes unavailable, backup power source 14 will supply sufficient voltage to provide 10 amperes of current in place of the unavailable primary power supply.

In an alternate embodiment, backup power source 14 may take over and supply power in place of all primary power supplies 12a-12n in the event that any one of primary power supplies 12a-12n is unavailable or malfunctioning. In the example above, if one of the three primary power supplies becomes unavailable, all three primary power supplies will stop providing power, and backup power source 14 will take over and provide all 30 amperes to NACs 16a-16n.

Figure 2:
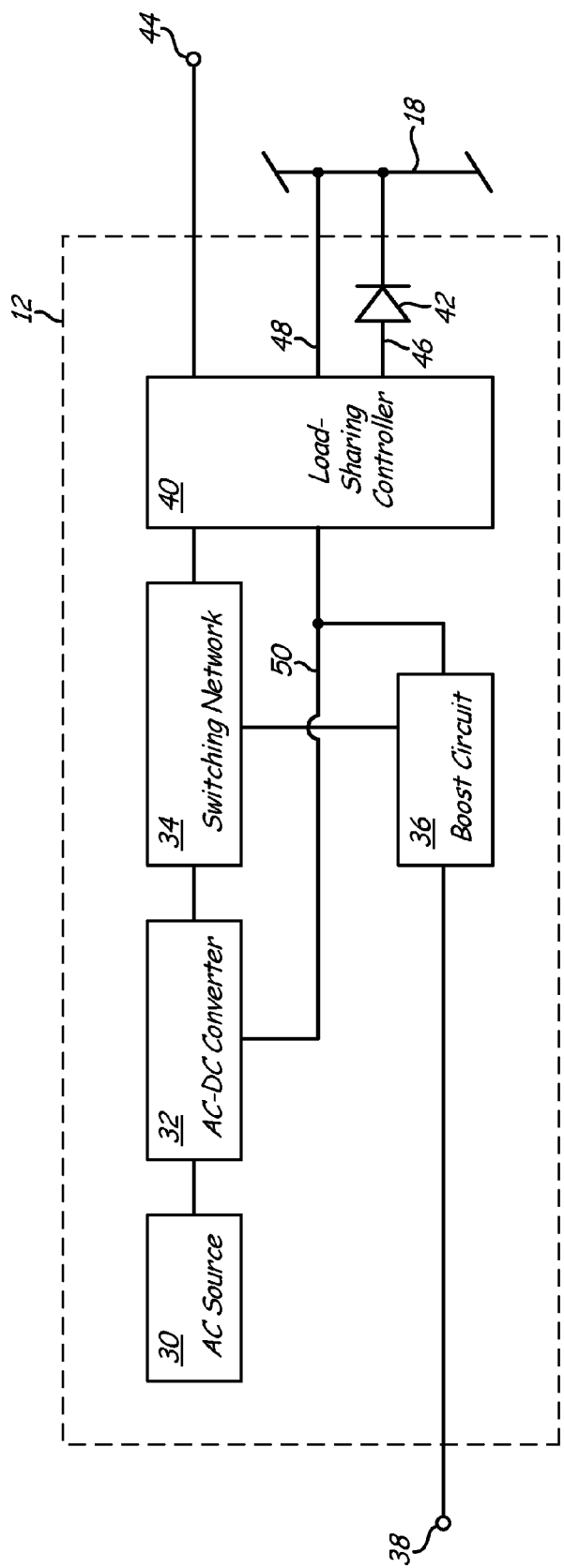
FIG. 2 is a block diagram of an embodiment of a primary power supply of the present invention.

FIG. 2 is a block diagram of a primary power supply 12. Primary power supply 12 includes AC power source 30, AC-DC converter 32, switching network 34, boost regulator circuit 36, backup power source input 38, load-sharing controller 40, diode 42, output 44, load-sharing output path 46, load-sharing input path 48, and load-sharing control path 50. Backup power source input 38 receives power from backup power source 14. AC power source 30 may be any readily available electrical power source and is typically AC mains power provided by a power utility company. AC-DC converter 32 converts the output of AC power source 30 to a DC output for supplying NACs 16a-16n with a working voltage and current.

Switching network 34 is used to select between the output of AC-DC converter 32, and the output of boost regulator circuit 36. Switching network 34 selects the output of AC-DC converter 32 when AC power source 30 is operational. If AC power source 30 is unavailable or malfunctioning, switching network 34 selects the output of boost regulator circuit 36.

Boost regulator circuit 36 operates to boost the voltage from backup power source 14 when a respective AC power source 32 is unavailable and backup power source 14 is not supplying enough voltage for power system 10 to provide a working voltage and current to NACs 16a-16n. When the voltage of backup power source 14 falls below the voltage needed for system 10 to provide a working voltage and current to NACs 16a-16n, respective boost regulator circuit 36 of each unavailable primary power supply 12a-12n boosts the voltage from backup power source 14 such that a sufficient voltage for system 10 to provide a working voltage and current to each of the NACs 16a-16n is provided.

For example, if two out of three primary power supplies are malfunctioning, and NACs 16a-16n require a total of 30 amperes of current to operate, backup power source 14 must supply a sufficient voltage to each of the two unavailable primary power supplies to produce the missing 10 amperes of current. If the voltage necessary to produce the 10 amperes of current for each unavailable primary power supply is 22.5 volts, then each boost regulator circuit 36 of the unavailable primary power supplies will operate when the backup voltage source 14 is producing a voltage less than 22.5 volts on respective backup source input 38. If no primary power supply is operating on backup power, boost regulator circuit 36 may operate to charge backup power source 14.

Load-sharing controller 40 operates to regulate the output current on output 44. Load-sharing controller 40 senses the current on output 44 and communicates to load-sharing output path 46 a reference voltage proportional to the output current. This reference voltage is communicated to load-sharing bus 18 through diode 42. Diode 42 acts to diode OR the reference voltages of each of primary power supplies 12a-12n. Therefore, the reference voltage is only communicated onto load-sharing bus 18 if the reference voltage is higher than the reference voltage that is already on load-sharing bus 18. This ensures that load-sharing bus 18 will always contain the reference voltage of the primary power supply that is producing the greatest output current.

Load-sharing controller 40 uses load-sharing control path 50 to regulate the current on output 44 based upon the reference voltage on load-sharing bus 18. If the reference voltage produced by load-sharing controller 40 is lower than the reference voltage on load-sharing bus 18, load-sharing controller 40 will regulate the output voltage from AC-DC converter 32 or boost regulator circuit 36, depending on which is selected, such that the output current on output 44 produces a reference voltage approximately equal to that of the reference voltage on load-sharing bus 18.

Figure 3:
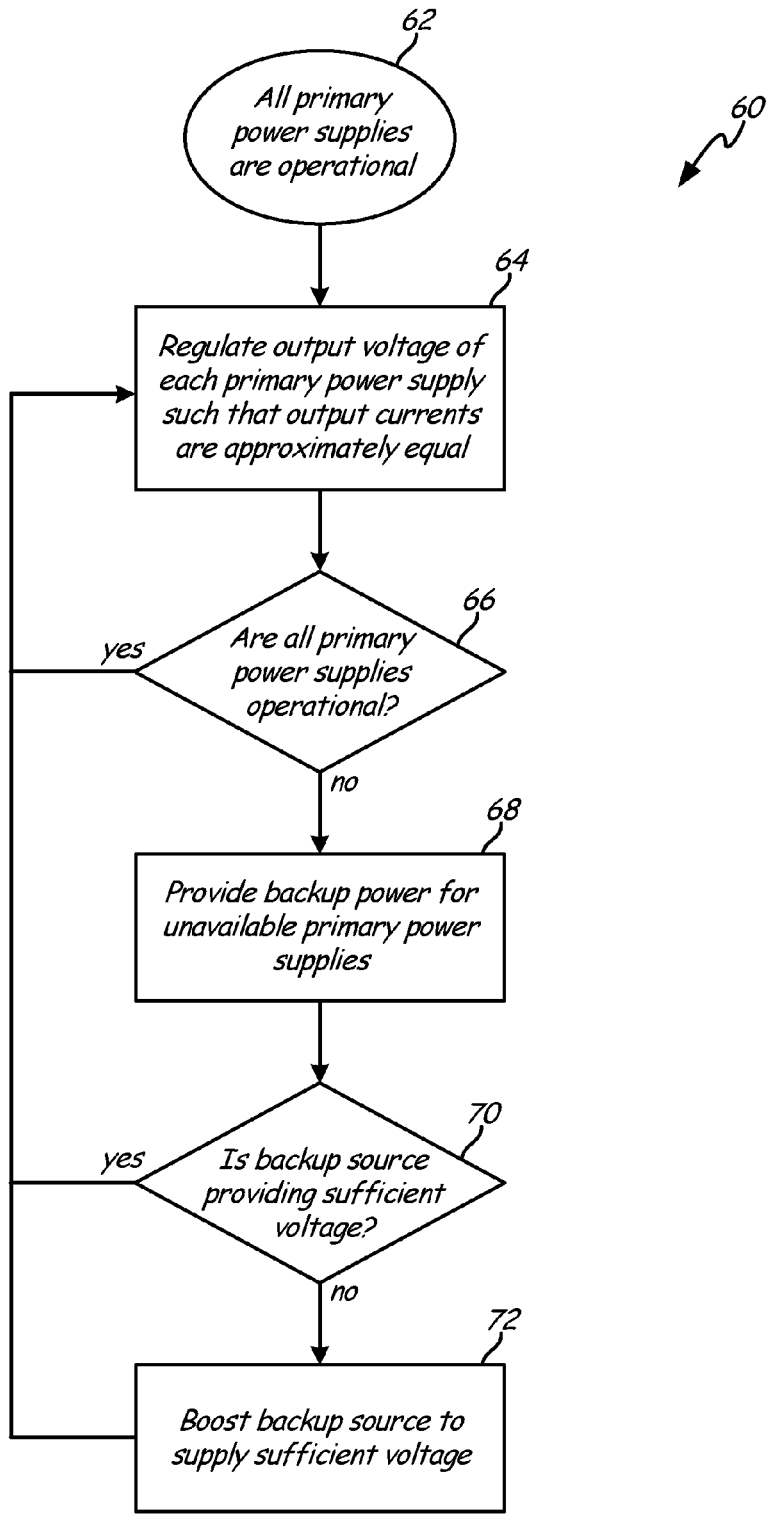
FIG. 3 is a flow chart illustrating a method of providing load-sharing and boosted voltage for one or more NACs according to an embodiment of the present invention.

FIG. 3 is a flowchart illustrating a detailed method 60 of providing load-sharing and boosted voltage for one or more NACs 16a-16n. At step 62, all primary power supplies 12a-12n are functional. At step 64, output voltages of each primary power supply are regulated such that each primary power supply provides approximately equal current to NACs 16a-16n. At step 66, it is determined if all primary power supplies 12a-12n are operational. If one of the primary power supplies 12a-12n is unavailable then power system 10 proceeds to step 68. If all primary power supplies are operational, then power system 10 returns to step 64 and continues to regulate the output voltage of each primary power supply. At step 68, switching network 34 of the primary power supply that is unavailable selects power from backup power source 14. At step 70, it is determined if backup power source 14 is supplying a sufficient voltage to provide a working voltage and current to NACs 16a-16n. If backup power source 14 is not supplying a sufficient voltage, then power system 10 proceeds to step 72. If backup power source 14 is supplying sufficient voltage, then power system 10 returns to step 64 and continues to regulate the output voltage of each primary power supply. At step 72, boost regulator circuit 36 of the primary power supply that is unavailable boosts the voltage of backup power source 14 to a voltage that is sufficient to provide NACs 16a-16n with a working voltage and current. After step 72, power system 10 returns to step 64 and continues to regulate the output voltage of each primary power supply, including those primary power supplies providing output voltage from backup power source 14.

In this way, the present invention describes an electrical power system that provides a working voltage and current to one or more notification appliance circuits (NACs). Although the present invention has been described with reference to preferred embodiments, workers skilled in the art will recognize that changes may be made in form and detail without departing from the spirit and scope of the invention.

The invention claimed is:

1. A power system for supplying power to emergency notification circuits, the power system comprising:
   one or more notification circuits for powering emergency notification devices;
   a backup power source; a plurality of primary power supplies connected in parallel and configured to provide a combined current to the one or more notification circuits, wherein each of the plurality of primary power supplies includes a boost regulator circuit for boosting voltage of the backup power source; and
   wherein each of the plurality of primary power supplies regulates an output current to approximately equal a highest output current provided by one of the plurality of primary power supplies;
   wherein regulating current from each primary power supply comprises;
   producing a reference voltage from each primary power supply representative of an output current of the respective primary power supply;
   obtaining a highest reference voltage from each primary power supply; and
   adjusting the output current of each primary power supply such that each primary power supply produces a new reference voltage representative of the adjusted output current that is approximately equal to the highest reference voltage.

2. The power system of claim 1, wherein the plurality of primary power supplies each include a load-sharing controller to produce a reference voltage representative of the output current of the respective primary power supply.

3. The power system of claim 2, wherein the highest output current is determined by diode OR'ing all of the reference voltages produced by the load-sharing controller of each of the plurality of primary power supplies.

4. The power system of claim 1, wherein the boost regulator circuit provides as an output:
- the voltage of the backup power source when the voltage of the backup power source is above a specified voltage; or
- a boosted voltage when the voltage of the backup power source is below the specified voltage.

5. The power system of claim 4, wherein each of the plurality of primary power supplies further include an AC power source, an AC-DC converter, and a switching network.

6. The power system of claim 5, wherein the switching network is configured to supply as a source of voltage and current from the primary power supply:
- the output of the AC-DC converter when the AC power source is available; or
- the output of the boost regulator circuit when the AC power source is unavailable.

7. A method for powering emergency notification devices, the method comprising:
- providing power to one or more notification circuits from a plurality of primary power supplies connected in parallel;
- regulating current from each primary power supply such that each primary power supply contributes an approximately equal fraction of the total current provided by the plurality of primary power supplies;
- upon one or more of the plurality of primary power supplies becoming unavailable, providing power from a backup power source in place of any unavailable primary power supply; and upon voltage from the backup power source dropping to a level such that there is insufficient voltage from the backup power source to provide a working voltage and current to the one or more notification circuits, boosting the voltage of the backup power source such that there is sufficient voltage to provide a working voltage and current to the one or more notification circuits;
- wherein regulating current from each primary power supply comprises;
- producing a reference voltage from each primary power supply representative of an output current of the respective primary power supply;
- obtaining a highest reference voltage from each primary power supply; and
- adjusting the output current of each primary power supply such that each primary power supply produces a new reference voltage representative of the adjusted output current that is approximately equal to the highest reference voltage.

8. The method of claim 7, wherein each of the primary power supplies includes an AC power source, an AC-DC converter, a switching network, a load-sharing controller, and a boost regulator circuit for boosting the voltage of the backup power source.

9. The method of claim 8, wherein providing power from the backup power source comprises the switching network of the unavailable primary power supply selecting an output of the boost regulator circuit.

10. The method of claim 9, wherein the boost regulator circuit provides as an output:
- the voltage of the backup power source when the voltage of the backup power source is above a specified voltage; or
- a boosted voltage when the voltage of the backup power source is below the specified voltage.

11. The method of claim 10, wherein the specified level is a voltage that provides a working current and voltage to the one or more notification circuits.

12. An apparatus comprising:
- one or more notification appliance circuits (NACs);
- a plurality of primary power sources for providing a shared current to the one or more notification appliance circuits;
- a battery for providing power when one or more of the plurality of primary power sources is unavailable;
- a plurality of boost regulator circuits for boosting voltage of the battery when the voltage of the battery drops to a minimum level; and
- a plurality of load-sharing controllers, the plurality of load-sharing controllers configured to regulate a current from each of the plurality of primary power sources to approximately equal a highest current provided by one of the plurality of primary power sources;
- wherein regulating current from each primary power supply comprises;
- producing a reference voltage from each primary power supply representative of an output current of the respective primary power supply;
- obtaining a highest reference voltage from each primary power supply; and
- adjusting the output current of each primary power supply such that each primary power supply produces a new reference voltage representative of the adjusted output current that is approximately equal to the highest reference voltage.

13. The apparatus of claim 12, wherein the plurality of load-sharing controllers produce a plurality of reference voltages representative of currents from each of the plurality of primary power sources.

14. The apparatus of claim 13, wherein the highest current is determined by diode OR'ing the plurality of reference voltages.

15. The apparatus of claim 14, further comprising: a plurality of switching networks configured to select between one of the plurality of primary power sources, and one of the plurality of boost regulator circuits.

16. The apparatus of claim 12, wherein the minimum level is a voltage that is sufficient to ensure that the one or more NACs are provided with a working voltage and current.

* * * * *